United States Patent [19]

Yokomori et al.

[11] Patent Number: 4,877,301
[45] Date of Patent: Oct. 31, 1989

[54] COVERED OPTICAL WAVEGUIDE HAVING AN INLET OPENING

[75] Inventors: Kiyoshi Yokomori; Tami Isobe, both of Yokohama, Japan

[73] Assignee: Ricoh Company, Ltd., Tokyo, Japan

[21] Appl. No.: 255,702

[22] Filed: Oct. 11, 1988

[30] Foreign Application Priority Data

Oct. 9, 1987 [JP] Japan ................................ 62-256089
Oct. 9, 1987 [JP] Japan ................................ 62-256090

[51] Int. Cl.⁴ ................................................ G02B 5/14
[52] U.S. Cl. .................................. 350/96.19; 350/96.12
[58] Field of Search ................ 350/96.12, 96.13, 96.14, 350/96.15, 96.19, 96.20

[56] References Cited

U.S. PATENT DOCUMENTS

| | | | |
|---|---|---|---|
| 4,227,769 | 10/1980 | Phillips et al. | 350/96.19 |
| 4,301,462 | 11/1981 | Lowry | 350/96.19 X |
| 4,531,809 | 7/1985 | Carter et al. | 350/96.19 |
| 4,545,642 | 10/1985 | Auracher et al. | 350/96.19 |
| 4,565,422 | 1/1986 | Seymour et al. | 350/96.19 |
| 4,637,684 | 1/1987 | Tomita et al. | 350/96.19 |
| 4,653,844 | 3/1987 | Ward | 350/96.19 X |
| 4,699,449 | 10/1987 | Lam et al. | 350/96.12 X |
| 4,725,112 | 2/1988 | Bridges et al. | 350/96.12 |
| 4,756,734 | 7/1988 | Kersten et al. | 350/96.12 X |
| 4,762,382 | 8/1988 | Husain et al. | 350/96.12 |

Primary Examiner—William L. Sikes
Assistant Examiner—Akm E. Ullah
Attorney, Agent, or Firm—Cooper & Dunham

[57] ABSTRACT

An optical waveguide device includes an optical waveguide extending straight over a predetermined length, a metal cover layer formed on the optical waveguide at least partly and formed with an opening extending therethrough, and a prism fixedly attached to the metal cover film covering the opening. The prism has an index of refraction higher than that of the optical waveguide and the prism receives an incoming light beam and causes the light beam thus received to be coupled into the optical waveguide through the opening. The device may include a substrate on which the optical waveguide is formed with or without a buffer layer therebetween. A photodetector may also be formed integrally with the optical waveguide at one end thereof for detecting light coupled into and propagating along the optical waveguide. Such a device including a photodetector may be used as an optical component of an optical pick-up for use in an optical information recording and reproducing system.

29 Claims, 5 Drawing Sheets

COVERED OPTICAL WAVEGUIDE HAVING AN INLET OPENING

BACKGROUND OF THE INVENTION

1. Field of the Invention

This invention generally relates to an optical waveguide device for use in an optical pick-up or the like, and, in particular, to a covered optical waveguide device whose optical waveguide is covered at least partly and an inlet opening for guiding light into the optical waveguide is formed in a cover layer.

2. Description of the Prior Art

Figure 9:
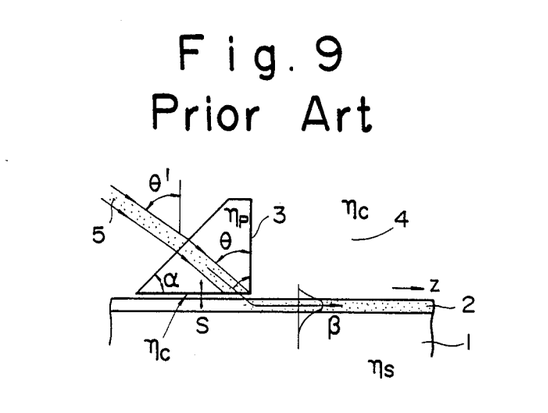
FIG. 9 is a schematic illustration showing in cross section a typical prior art optical waveguide device.

In order to have incident light optically coupled to an optical waveguide, use may be made of any of several prior art methods, such as prism coupling, grating coupling and end surface coupling. Among these prior art methods, the prism coupling method is often preferred because of its easiness in application and high efficiency in having incident light coupled into the associated optical waveguide. The prism coupling method is schematically illustrated in FIG. 9 and the principle of this method can, for example, be found on pages 237-243 of "OPTICAL INTEGRATED CIRCUIT" by Hiroshi Nishihara, OHM Publishing Co., Ltd. For completeness, the principle of the prism coupling method will be briefly described with reference to FIG. 9 below.

A substrate 1 having an index of refraction $n_s$ is formed with an optical waveguide 2 at its top, and a prism 3 having an index of refraction $n_p$ is placed in close proximity with the top surface of the optical waveguide 2 with a thin layer of a medium 4, typically air, sandwiched therebetween. Under the condition, when a light beam 5 is directed at an angle $\theta$ with respect to the bottom surface of the prism 3, the propagation constant B of this light wave in the Z direction shown in FIG. 9 may be expressed by the following equation.

$$B = n_p \cdot k \cdot \sin \theta \quad (1)$$

where, $k = 2\pi/\lambda$ and $\lambda$: wavelength of incident light. Denoting the angle of the apex of the prism 3 by $\alpha$, then, according to the Snell's law, the incident angle $\theta'$ outside of the prism 3 may be expressed by the following equation.

$$n_c \cdot \sin(\theta' - \alpha) = n_p \cdot \sin(\theta - \alpha) \quad (2)$$

Now, if the gap or spacing S between the prism 3 and the optical waveguide 2 is larger, the incident light beam 5 will be totally reflected at the bottom surface of the prism 3 when the angle $\theta$ satisfies the condition of $\beta/k$ being larger than $n_c$; however, evanescent waves are produced in the medium 4 having an index of refraction $n_c$. Accordingly, if the angle $\theta$ is adjusted so as to make the value of $\beta$ shown in equation (1) equal to the propagation constant of a certain guided mode as the spacing S is made gradually smaller, the evanescent wave produced in the optical waveguide 2 comes to be matched in phase with the guided mode, so that a distributed coupling occurs to thereby produce guided light.

Denoting the distribution of amplitude of the guided light and incident light beam 5 in Z direction by $$g(z) = exp(-\alpha \cdot z),$$

the coupling efficiency according to this method is predominantly determined by the magnitude relationship between the beam width and $1/\alpha r$. And, if the value of this $1/\alpha r$ is in the order to 10 microns, the spacing S will be in the order of submicrons. Besides, since $\alpha r$ is strongly dependent upon S, an extreme care is required in adjustments of spacing S.

Furthermore, if the incident light beam 5 is directed toward the front end of the bottom surface of the prism 3 rather than toward the rear end as shown in FIG. 9, the light which has once been completely coupled into the optical waveguide 2 again may go out of the optical waveguide 2 in the form of evanescent wave during its propagation along the optical waveguide 2. Thus, in this case, light may be coupled into the optical waveguide 2 through the prism 3 at one point, but the light may also be decoupled from the optical waveguide 2 at another point through the prism 3. As a result, the determination of point of coupling of light into the optical waveguide 2 needs careful consideration and adjustments.

SUMMARY OF THE INVENTION

In accordance with one aspect of the present invention, there is provided an optical waveguide device comprising an optical waveguide, a cover layer formed on the optical waveguide at least partly and formed with an opening, and an input coupler element provided on the cover layer in alignment with said opening, whereby said cover layer is comprised of a material having a complex dielectric constant whose real component is negative in value. In the preferred embodiment, the input coupler element is a prism comprised of a dielectric material having an index of refraction which is higher than that of the optical waveguide.

In accordance with another aspect of the present invention, there is provided an optical pick-up which includes the optical waveguide device described above and one or more light detecting elements integrally formed in the device so as to detect the light which propagates along the optical waveguide. Such an optical pick-up has an integrated structure which is compact in size and sturdy in structure, thereby contributing to reduce the overall size of an optical information processing system, such as an optical disc system.

It is therefore a primary object of the present invention to obviate the disadvantages of the prior art as described above and to provide an improved optical waveguide device.

Another object of the present invention is to provide an improved optical waveguide device integrated in structure and requiring no precise adjustments in use.

A further object of the present invention is to provide an improved optical waveguide device simple in structure and easy to manufacture and yet high in reliability and enhanced in performance.

A still further object of the present invention is to provide an improved optical waveguide device having an extremely high coupling efficiency.

A still further object of the present invention is to provide an improved optical waveguide device particularly suited for use in an optical pick-up.

A still further object of the present invention is to provide an improved optical pick-up compact in size, light in weight and easy to manufacture.

A still further object of the present invention is to provide an improved optical pick-up integrated in structure and free of precise adjustments.

Other objects, advantages and novel features of the present invention will become apparent from the following detailed description of the invention when considered in conjunction with the accompanying drawings.

DESCRIPTION OF THE PREFERRED EMBODIMENTS

Figures 1, 2, 3A, 3B, 3C, 3D, 3E, 4:
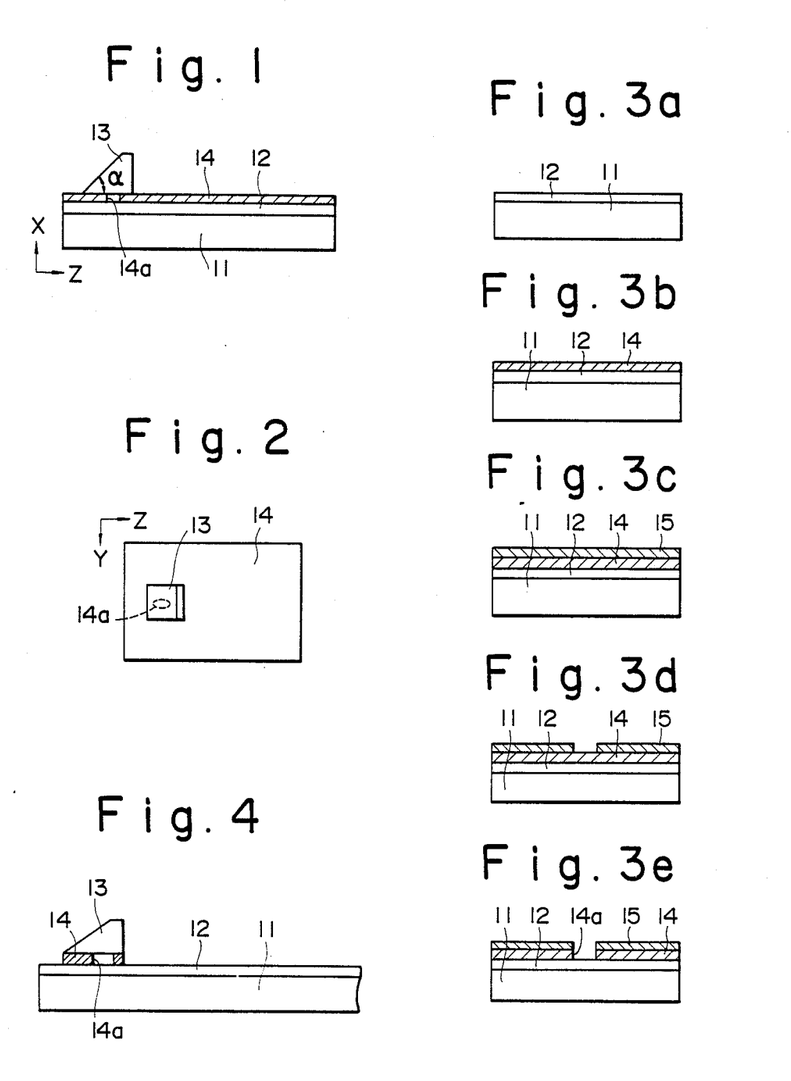
FIG. 1 is a schematic illustration showing in cross section an optical waveguide device constructed in accordance with one embodiment of the present invention.
FIG. 2 is a schematic illustration showing in plan view the optical waveguide device of FIG. 1.
FIGS. 3a through 3e are schematic illustrations showing in cross section a sequence of steps for manufacturing an optical waveguide device in accordance with one embodiment of the present invention.
FIGS. 4 through 8 are schematic illustrations showing various optical waveguide devices constructed in accordance with various embodiments of the present invention.

Referring now to FIGS. 1 and 2, there is schematically shown in cross section an optical waveguide device constructed in accordance with one embodiment of the present invention. As shown, the present optical waveguide device includes a substrate 11 having an optical waveguide 12 formed thereon from a dielectric material having an index of refraction higher than that of the material forming the substrate 11. On the optical waveguide 12 is formed a clad or cover layer 14 from a selected material to a predetermined thickness. The cover layer 14 is formed, for example, by depositing a metal onto the optical waveguide 12. And, a portion of the cover layer 14 is removed to thereby form an opening or through-hole 14a in the cover layer 14 at a predetermined location. Such an opening 14a is formed at a location where an inlet coupler element, such as a prism, 13 is to be placed on top of the cover layer 14 such that the prism 13 is in registry in position with the opening 14a to completely cover the opening 14a. The prism 13 is preferably fixedly attached or cemented to the optical waveguide 14 to thereby define an integrated structure.

The prism 13 serves as an inlet coupler element for receiving an incident light beam and guiding the thus received light beam toward the optical waveguide 12 and thus the prism 13 is comprised of a material having a higher index of refraction than that of the optical waveguide 12. The cover layer 12 covers the optical waveguide 12 at its top at least a part thereof and it is comprised of a material having a complex index of refraction whose real component is negative in value. In general, a metal has a complex index of refraction whose imaginary component is larger than its real component in a light wavelength region. For example, the complex index of refraction for Ag is $_{Ag}=0.065+i4.0$ and the complex index of refraction for Al is $_{Al}=1.2+i7.0$. Here, it is assumed that the wavelength is 6,328 angstroms. A wave equation and its solutions normally include a square of complex dielectric constant, i.e., $^2$, rather than a complex index of refraction, i.e., , itself. Thus, in the case of an optical waveguide structure including a material having a complex index of refraction, the real part or component of the complex dielectric constant squared, i.e., $^2$, determines its optical property and the imaginary part or component determines a propagation loss. As a result, a metal may generally be said to have a negative dielectric constant and serve as a glossy dielectric material.

When a monochromatic light beam is directed into the prism 13 at a certain incident angle, the light beam is reflected at the interface between the bottom surface of the prism 13 and the cover layer 14 or absorbed by the cover layer 14 where the cover layer 14 is in contact with the bottom surface of the prism 13, and, thus, no light beam is introduced into the optical waveguide 12. On the other hand, if a medium present in the opening 14a formed in the cover layer 14 is a dielectric material, such as air as in the present embodiment, having an index of refraction which is lower than that of the optical waveguide 12, the incident light beam produces an evanescent wave inside of the opening 14a. In this case, if this evanescent wave is matched in phase with the guided mode of the optical waveguide 12, this wave is coupled into the optical waveguide 12. Since the cover layer 14 has a negative dielectric constant, the light once coupled into the optical waveguide 12 in this manner propagates along the optical waveguide 12 as being completely confined therein. That is, the light once coupled into the optical waveguide 12 will not be decoupled from the optical waveguide 12 through the prism in the form of an evanescent wave.

Now, a method of manufacturing an optical waveguide device in accordance with one embodiment of the present invention will be described step by step with reference to FIGS. 3a through 3e. It is to be noted that direction Z indicates the direction of propagation of light. In the first place, a substrate 11 of Pylex glass having an index of refraction equal to 1.472 is prepared. On the substrate 11 is formed an optical waveguide 12 by sputtering Corning #7059 glass having an index of refraction equal to 1.544 to the thickness of 5,000 angstroms, as shown in FIG. 3a. Then, a metal, such as Ag, is deposited onto the optical waveguide 12 to thereby form the cover (clad) layer 14 to the thickness of 3,000 angstroms by evaporation, as shown in FIG. 3b. Then, a resist layer 15 is formed on the cover layer 14 and baked, as shown in FIG. 3c. Then, as shown in FIG. 3d, after exposure and development, the cover layer 14 of Ag is partly etched away, for example, using an etching solution of nitric acid family and the resist layer 15 as a mask. As a result, the opening 14a is formed in the cover layer 14 as shown in FIG. 3e. Then, after removing the resist layer 15, a prism 13 is fixedly attached to the cover layer 14 in alignment in location with the opening 14a.

It is to be noted that although the resist layer 15 has been removed in the above-described embodiment, the resist layer 15 may be left formed on the cover layer 14 to define part of the resulting cover layer 14. Furthermore, in forming the cover layer 14 and the opening 14a, instead of forming the opening 14a in the cover layer 14 after formation of the cover layer 14 on the waveguide 12, after formation of a mask corresponding in pattern to the opening 14a, a metal, such as Ag, may be deposited to thereby directly form the cover layer 14 provided with the opening 14a at an appropriate location.

In the preferred embodiment, the prism 13 is comprised of SFS-1 glass having an index of refraction equal to 1.9141 and an apex angle of 45°. The incident light beam may be a beam emitted from a He-Ne laser and having the wavelength of 6,328 angstroms. In order to excite the T-E mode, the direction of linear polarization is set in agreement with the direction of s polarization.

Since the equivalent index of refraction of T-$E_0$ mode of such an optical waveguide 12 is 1.49438, if an incident angle $\theta'$(see FIG. 9) into the prism 13 is calculated based on the before-mentioned equations (1) and (2), we obtain $\theta'=57.2°$. Thus, with the incident angle set at 57.2°, when a laser beam emitted from a He-Ne laser was directed into the prism 13, it was confirmed that the light was coupled into the optical waveguide 12 in T-$E_0$ mode at an efficiency close to 80% with respect to the input power.

In the above-described embodiment, the thickness of the cover layer 14 of Ag is set at 3,000 angstroms so as to set the spacing between the prism 13 and the optical waveguide 12 at a value approximately half of the wavelength of the incident light, under which condition a maximum coupling efficiency can be attained. However, it is desirous to form the cover layer 14 to the thickness having a value equal to the spacing between the prism 13 and the cover layer 12 where the incident efficiency is at a maximum. In the above-described embodiment, the laser light beam emitted from the He-Ne laser has a diameter of 1 mm, and the opening 14a formed in the cover layer 14 should have a diameter which is substantially equal to the diameter of the laser beam. In the above-described embodiment, the opening 14a is elliptical in a cross sectional shape as shown in FIG. 2; however, the opening 14 may have any other desired shape, such as a circular cross sectional shape. The size of the opening 14a should be comparable or somewhat smaller than the size of the incident light beam because if the opening 14a is too large, there is a chance that the light once coupled into the optical waveguide 12 is again decoupled from the optical waveguide 12.

As described above, in accordance with the present embodiment, it is only necessary to direct an incident light beam toward the prism 13 at an angle such that the incident light beam is matched in phase with the guided mode of the optical waveguide 12 in order to cause the incident light beam to be optically coupled into the optical waveguide 12 efficiently. Thus, there is no need to make any undesired and cumbersome adjustment for the spacing between the optical waveguide 12 and the prism 13 and for the position of impingement of the incident light beam at the inlet surface of the prism 13.

As described previously, the imaginary component of the complex dielectric constant of a metal defines an element to determine a propagation loss of guided light. Thus, in the case where the cover layer 14 is formed across the entire surface of the optical waveguide 12 excepting the opening 14a, it is preferable to use a metal material having a complex dielectric constant whose imaginary component is as much as small. For example, for the light having a wavelength of 6,328 angstroms, Ag and Al have the following complex dielectric constants.

$$A_g{}^2 = -15.996 + i0.520$$

$$A_l{}^2 = -47.56 + i16.8$$

Thus, if a selection were to be made between Ag and Al for use in the present embodiment, it would be preferable to form the cover layer 14 using Ag.

FIG. 4 illustrates an optical waveguide device constructed in accordance with another embodiment of the present invention, which is similar in many respects to the device shown in FIGS. 1 and 2 excepting the fact that the cover layer 14 is formed on the optical waveguide 12 only partly thereof at the location where the prism 13 is to be provided. In this embodiment, the cover layer 14 is formed as a support layer to support thereon the prism 13.

Figure 5:
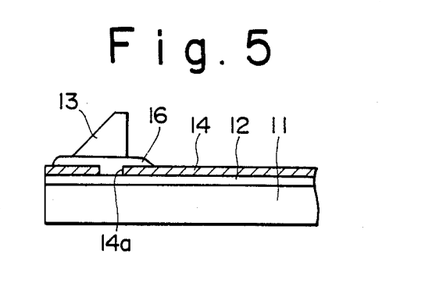

FIG. 5 illustrates a further embodiment of the present invention in which a photo-polymer having an index of refraction equal to 1.49 is additionally formed to plug the opening 14a of the cover layer 14 to thereby form a low refractive index layer 16 on which the prism 13 is placed. This low refractive index layer 16 may be formed from any material as long as it is light-transmitting and it has an index of refraction lower than that of the optical waveguide 12. In this embodiment, since the spacing between the optical waveguide 12 and the prism 13 is defined by a sum of the thickness of the cover layer 14 and the thickness of the low refractive index layer 16 on the cover layer 14, the thickness of each of the cover layer 14 and the low refractive index layer 16 should be so set that the combined thickness amounts to an optimal spacing between the optical waveguide 12 and the prism 13.

Figure 6:
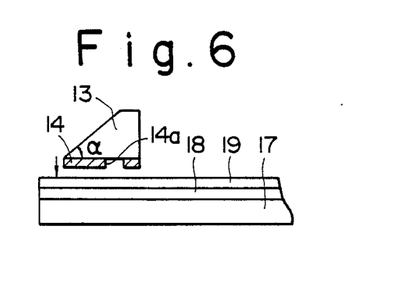

FIG. 6 illustrates a further embodiment of the present invention. Basically, the previously described embodiments have a three-layer structure. On the other hand, the present embodiment has basically a four-layer structure. That is, in the present embodiment as shown in FIG. 6, on a Si substrate 17 is formed a buffer layer 18 of $SiO_2$ having an index of refraction equal to 1.47 to the thickness of 1 micron by thermal oxidation. And, a nitride layer 19 having an index of refraction equal to 1.85 is formed on the buffer layer 18 as an optical waveguide to the thickness of 6,000 angstroms. The prism 13 in the present embodiment is comprised of $TiO_2$ having $n_e=2.872$ and $n_o=2.584$ and has an apex angle of 40°. It should, however, be noted that the prism 13 may have any desired shape and any desired material as long as it serves as an inlet coupler element. In the present embodiment, Ag is deposited on the bottom surface of the prism 13 to form the cover layer 14 and patterned, for example by photolithography, to define the opening 14a in the cover layer 14. Thus, when the prism 13 having the cover layer 14 formed at its bottom surface by deposition is fixedly attached to the optical waveguide 19 at a desired location, there results an optical waveguide device shown in FIG. 6 having basically a four layer structure.

In this embodiment, when a light beam was directed into the prism 13 at an incident angle set at an angle 50.0°, which may be calculated from equations (1) and (2) described before and which permits to provide a phase matching with the equivalent index of refraction equal to 1.79064 of T-M$_0$ mode of optical waveguide 19 with the direction of polarization of the incident light beam having the wavelength of 6,328 angstroms from the He-Ne laser set in p polarization, the coupling efficiency close to 80% was obtained.

Figure 7:
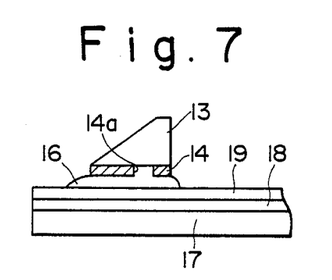

FIG. 7 illustrates a still further embodiment of the present invention, which is effectively a combination of the embodiments shown in FIGS. 5 and 6. That is, in the present embodiment, the cover layer 14 is formed at the bottom surface of the prism 13 and then the opening 14a is defined in the cover layer 14. Then, an epoxy resin having an index of refraction equal to 1.581 is formed on the bottom surface of the cover layer 14 filling the opening 14a to thereby define the low refractive index layer 16. Then, the prism 13 having all of these cover layer 14 and the low refractive index layer 16 is fixedly attached to the optical waveguide 19 at a desired location thereof to thereby obtain the structure shown in FIG. 7.

Figure 8:
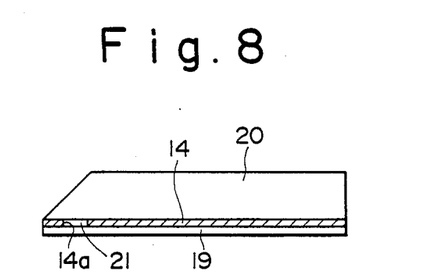

FIG. 8 illustrates a still further embodiment of the present invention in which use is made of a plate-shaped prism 20 having a predetermined apex angle at its bottom left end. That is, the plate-shaped prism 20 has a wedge-shaped end at one end to thereby define a predetermined apex angle at its bottom end. Ag is deposited on the bottom surface of this plate-shaped prism 20 to thereby form the cover layer 14 which is then patterned, for example by photolithography, to define the opening 14a. Then, the opening 14a is filled with a photo-polymer 21, and then a nitride is deposited on the bottom surface of the cover layer 14 to thereby form the optical waveguide 19. In this embodiment, the plate-shaped prism 20 also serves as a support structure as in the substrate 11 or 17 in the previous embodiments. Thus, the optical waveguide structure is simplified extremely in this embodiment.

Figures 17, 18, 19:
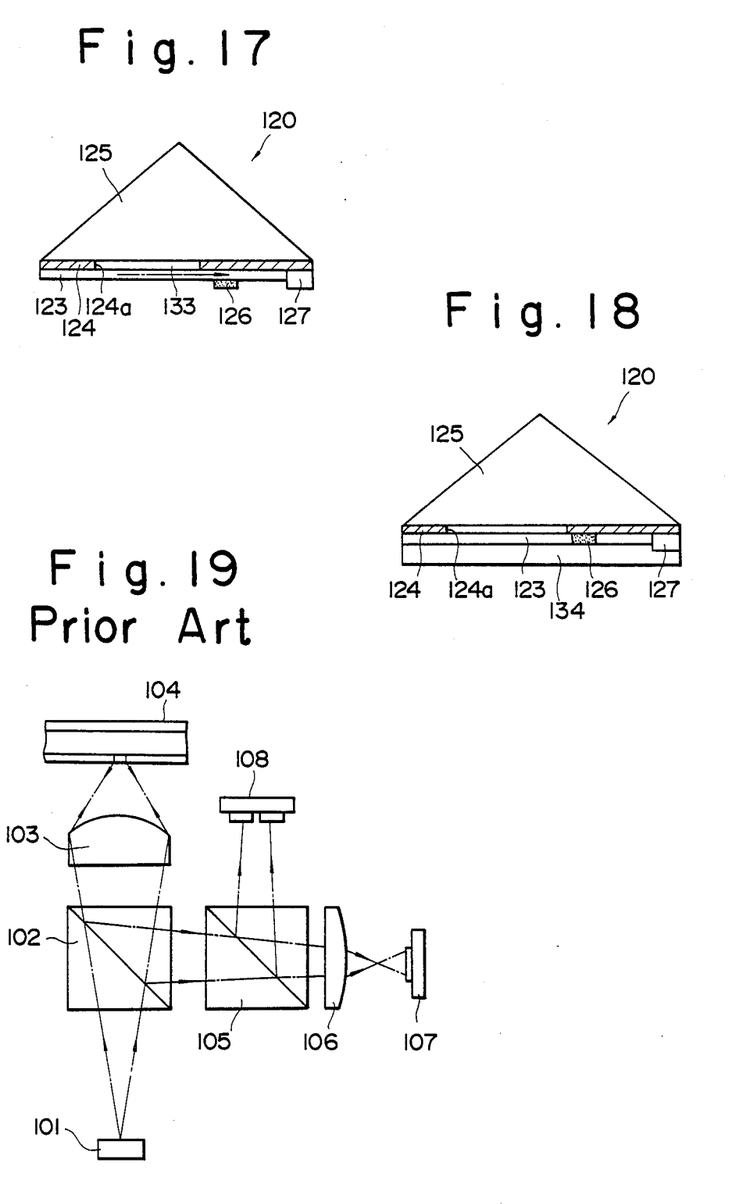
FIG. 19 is a schematic illustration showing a typical prior art optical pick-up.

Another aspect of the present invention will now be described. This aspect of the present invention relates to an optical pick-up for use in an optical information recording/reproducing system employing an optical disc, CD, CD-ROM or WORM. A typical prior art optical information recording/reproducing system is schematically shown in FIG. 19. A laser beam emitted from a semiconductor laser 101 passes through a deflection beam splitter 102 and a focusing lens 103 to be focused onto the recording surface of an optical information recording medium, such as an optical disc, 104. The light reflected by the optical disc 104 passes again through the lens 103, but in the opposite direction this time, and is separated from the incident light beam by the deflection beam splitter 102. The thus separated light beam reflected from the optical disc 104 passes through a beam splitter 105 and then an astigmatism producing cylindrical lens 106 so that the light emerging from the cylindrical lens 106 is focused onto a photodetector 107 having a four-division light-receiving structure. Accordingly, the photodetector 107 produces a focusing error signal based on a well-known astigmatism method, which is used for effecting a focus servo control operation of the present optical pick-up.

On the other hand, part of the light beam is separated by the beam splitter 105 and directed toward another photodetector 108 for detecting a tracking error signal. This photodetector 108 has a two-division light-receiving structure and a tracking error signal is produced by processing the detected signals by a well-known push-pull method, and the tracking error signal thus produced is then used in a track servo control operation of the present optical pick-up. An information signal carrying information recorded on the optical disc 104 is obtained by processing the signals from both of the photodetectros 107 and 108.

However, in such a prior art optical pick-up, all of the optical elements defining together the optical pick-up are separate, relatively large and heavy. As a result, the overall size of the optical pick-up tends to be bulky and heavy. In addition, assembling of the optical pick-up is cumbersome and requires many adjustments among elements. Thus, the resulting optical pick-up tends to lack mechanical stability and the performance tends to fluctuate.

This aspect of the present invention is directed to obviate the problems described above with respect to the prior art optical pick-up by using an integrated optical waveguide device as described earlier in this specification with respect to the first aspect of the present invention.

Figure 10:
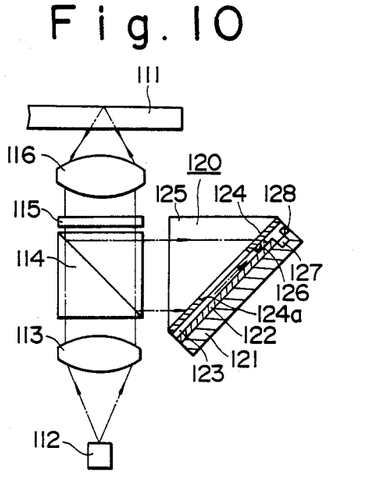
FIG. 10 is a schematic illustration showing partly in cross section an optical pick-up constructed in accordance with one embodiment of the present invention.
Figure 11:
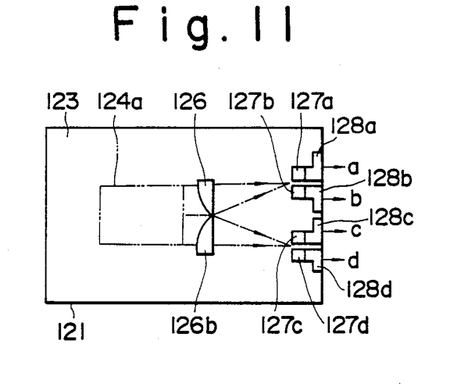
FIG. 11 is a schematic illustration showing in plan view of the optical pick-up at a plane corresponding to the surface of the optical waveguide.

Referring now to FIGS. 10 and 11, there is schematically shown an optical pick-up constructed in accordance with one embodiment of this aspect of the present invention. As shown, the present optical pick-up includes a semiconductor laser 112 located opposite to an optical disc 111 as an optical information recording and reproducing medium. Interposed between the semiconductor laser 112 and the optical disc 111 are a collimator lens 113, a deflection beam splitter 114, a quarter wavelength plate 115 and an objective lens 116 as spaced apart from each other and arranged in the order mentioned from bottom to top. Thus, a laser beam emitted from the semiconductor laser 112 is finally focused onto the recording surface of the optical disc 111 by the objective lens 116. The laser beam is then partly reflected by the optical disc 111 and this reflected light beam passes through the object lens 116 and the quarter wavelength plate 115 in the opposite direction this time, and, then, this reflected light beam is separated from the incident light beam at the deflection beam splitter 114. The reflected light beam thus separated by the deflection beam splitter 114 is then directed toward a detecting optical system 120 which constitutes the main feature of this aspect of the present invention.

The detecting optical system 120 includes a Si substrate 121 having a buffer layer 122 formed thereon from SiO$_2$. An optical waveguide 123 is formed on the buffer layer 122, and a metal cover layer 124 of a predetermined thickness is formed on the optical waveguide 123. The metal cover layer 124 is formed with a through-hole or opening 124a at a desired location so as to allow the light beam from the beam splitter 114 to be coupled into the optical waveguide 123 therethrough. And, a prism 125 having a triangular cross section and comprised of a dielectric material having an index of refraction larger than that of the optical waveguide 123 is fixedly attached to the cover film 124 so as to entirely cover the opening 124a. With this structure, the light reflected by the optical disc 111 is deflected by the deflection beam splitter 114 to be separated from the incident light beam and to be directed into the prism 125 of the detecting optical system 120. Normally, this incident light would be totally reflected by the optical waveguide 123 exposed by the opening 124a of the metal cover layer 124. However, if the incident light beam is matched in phase with the guided mode of the optical waveguide 123, the incident light beam is coupled into cover layer 124. However, if the incident light beam is matched in phase with the guided mode of the optical waveguide 123, the incident light beam is coupled into the optical waveguide 123 through the opening 124a to thereby form guided light propagating along the optical waveguide 123. Under this condition, the metal cover layer 124 plays a role of a dielectric having a negative dielectric constant and thus serves as a clad layer of the optical waveguide 123. This is because the metal cover layer 124 has a property of the real component of its complex dielectric constant being negative in value as described previously with regards to the previous aspect of the present invention. Thus, for better understanding, a reader should refer to the description regarding the previous aspect of the present invention.

Thus, when a light beam is introduced into the prism 125, it is reflected and/or absorbed at the interface between the bottom surface of the prism 125 and the metal cover layer 124, so that the light beam is not coupled into the optical waveguide 123 through this interface. However, the medium occupying the space defined by the opening 124a defined in the metal cover layer 124 is a dielectric material having an index of refraction smaller than that of the optical waveguide 123 (the medium being air in the present embodiment), the incident light beam partly leaks into the medium in the opening 124a in the form of an evanescent wave. If this evanescent wave is matched in phase with the guided mode of the optical waveguide 123, then the evanescent wave is coupled into the optical waveguide 123. Since the metal cover layer 124 has a negative dielectric constant, the light wave thus coupled into the optical waveguide 123 propagates along the optical waveguide 123 as being completely confined therein.

As shown in FIG. 11, a pair of optical waveguide lenses 126a and 126b is formed at the downward end of the optical waveguide 123 with respect to the direction of propagation of the induced light. Thus, the light propagating along the optical waveguide 123 is divided into two beams by means of this pair of optical waveguide lenses 126a and 126b so that the thus divided light beams are focused at different locations. A photodetector 127 including a plurality of photodetector elements 127a through 127d are formed integrally with the optical waveguide 123 at respective locations to receive the divided light beams from the pair of lenses 126a and 126b. The photodetector elements 127a and 127b are so disposed that the light beam from the lens 126a may be focused at the center between these two elements 127a and 127b, and the other photodetector elements 127c and 127d are so disposed that the light beam from the other lens 126b may be focused at the center between these two elements 127c and 127d. Electrodes 128a through 128d are provided in contact with respective photodetector elements 127a through 127d to output detected signals a through d.

With such a detecting system, an information signal indicating the information recorded on the optical disc 111 may be detected in the form of a+b+c+d. And, a focusing error signal may be detected in the form of (a+d)−(b+c), and a tracking error signal may be detected in the form of (a+b)−(c+d).

A one method for manufacturing this optical detecting system 120 will now be described. In the first place, a Si substrate 121 is prepared and a buffer layer 122 of $SiO_2$ is formed on the Si substrate 121, for example, by thermal oxidation. And, in accordance with a well-known photolithography technique, that portion of the $SiO_2$ layer which is located in an area where a photodetector is to be formed is removed to expose the Si substrate. Then, using diffusion or ion implantation techniques, impurities are introduced into the Si substrate 121 through its exposed portion to thereby define photodiodes having a p-i-n structure and serving as photodetector elements 127a through 127d. Then, Corning #7059 glass is sputtered onto the buffer layer 122 to form an optical waveguide 123. Thereafter, a pair of optical waveguide lenses 126a and 126b is defined. The lenses 126a and 126b are formed, for example, by depositing a material, such as $TiO_2$ or SiN, having an index of refraction larger than that of the optical waveguide 123 on the optical waveguide in a predetermined pattern. Alternatively, these lenses 126a and 126b may also be formed by causing a predetermined portion of the optical waveguide 123 to be higher in refractive index, for example, by using introduction of impurities by diffusion, ion exchange or proton exchange.

Then, a metal, such as Ag, is deposited, for example, by evaporation or sputtering onto the optical waveguide 123 to thereby form a metal cover layer 124. As a material for forming the metal cover layer 124, such a metal material as Ag having a small value of the imaginary component of its complex dielectric constant and thus a smaller loss is preferred; however, use may be made of Au also. In this case, use is made of a mask to prevent Ag from being deposited into the opening 124a. Alternatively, use may be made of a process in which a metal cover layer 124 is formed across the entire surface of the optical waveguide 123 and then a portion of the metal cover layer 124 is etched away using an etchant of a nitric acid family based on a photolithographic method to form an opening 124a in the metal cover layer 124. Finally, a prism 125 having a right triangular cross section and comprised of a material having an index of refraction larger than that of the optical waveguide 123, such as flint glass or rutile is fixedly attached or cemented in position.

As an example, under the conditions of the prism 125 having an index of refraction equal to 2.08 and an apex angle equal to 45°, the optical waveguide 123 having the thickness equal to 4,200 angstroms and an index of refraction equal to 1.54 and the wavelength of a laser beam used being 7,800 angstroms, the incident angle of a light beam directed into the opening 124a of the metal cover layer 124 should be set at 45°.

In this manner, in accordance with this embodiment, those components of the prior art optical pick-up including the deflection beam splitter 105, cylindrical lens 106, and photodetectors 107 and 108 can be constructed integrally in the form of detecting optical system 120, and, thus, the optical pick-up may be constructed smaller in size and light in weight. In assembling, the detecting optical system 120 may be handled as a unit, and, thus, it is extremely eased to manufacture the present optical pick-up. In addition, since the detecting optical system 120 has an integrated structure, it requires virtually no adjustments. In particular, in accordance with the present embodiment, since the metal cover layer 124 provided with the opening 124a is located as sandwiched between the optical waveguide 123 and the prism 125 to have the light from the prism 125 coupled into the optical waveguide 123, there can be obtained a high waveguide efficiency, an excellent detecting operation with advantageous incident conditions.

Figures 12, 13:
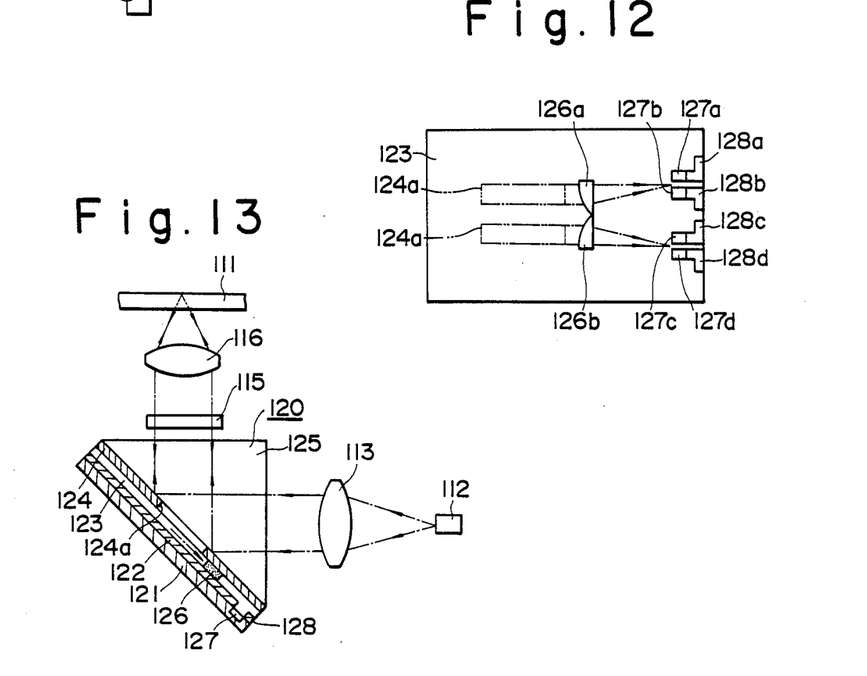
FIG. 12 is a schematic illustration showing a modification of the structure shown in FIG. 11.
FIGS. 13 through 18 are schematic illustrations showing various other embodiments of the present invention.

FIG. 12 illustrates a detecting optical system 120 which is a modification of the structure shown in FIGS.

10 and 11. In this embodiment, a pair of openings 124a is formed in the metal cover layer 124 extending in parallel with a recording track on the optical disc 111. With the provision of such a pair of openings 124a, that portion of the light reflected from the optical disc 111 which is high in intensity can be effectively coupled into the optical waveguide 123.

In both of FIGS. 11 and 12, the opening 124a is defined to be rectangular in shape; however, the opening 124a should not be limited only to such a shape and it may take any other desired shape, such as circular or elliptic shape. The opening 124a is preferably sized to be substantially equal to or slightly smaller than the diameter of the incident light beam so as to provide an enhanced coupling efficiency to the optical waveguide 123. In the above-described embodiment, the space defined by the opening 124a is filled with air having the spacing in the order of 1,000 angstroms to provide a low refractive index condition. As an alternative structure, the space defined by the opening 124a may be filled with a filler material, such as a photo-polymer, having a low index of refraction. In particular, use is typically made of an adhesive for fixed attachment of the prism 125 to the metal cover layer 124, and if such an adhesive is transparent and has an index of refraction lower than that of the optical waveguide 123, the opening 124a may be filled with such a transparent adhesive.

FIG. 13 illustrates another embodiment of this aspect of the present invention. It is to be noted that like elements are indicated by like numerals since the present embodiment is similar in basic structure to the previous embodiment. As shown, in the present embodiment, the deflection beam splitter 114 has been discarded, and the positions of the semiconductor laser 112 and the detecting optical system 120 have been varied. In this embodiment, it is so structured that light propagates along the optical waveguide 123 only in T-$E_0$ mode. More specifically, the optical waveguide 123 has an index of refraction equal to 1.54 and the thickness of 4,000 angstroms and the buffer layer 122 is comprised of $SiO_2$ and has an index of refraction equal to 1.46.

With this structure, a laser light, for example, of 780 nm emitted from the semiconductor laser 112 is collimated as it passes through the collimator lens 113 and then the thus collimated beam enters into the prism 125 having an index of refraction equal to 2.075. In this case, it is assumed that the direction of polarization of this laser beam is a polarization light directed in parallel with the plane of the drawing in FIG. 13. As a result, the light entering into the prism 125 reaches the interface between the prism 125 and the metal cover layer 124 and the opening 124a. The light reaching the interface between the metal cover layer 124 and the prism 125 is reflected mostly and the rest is absorbed in the metal cover layer 124. On the other hand, the light reaching the opening 124a is p polarized and is not matched in phase with guided mode T-$E_0$ of the optical waveguide 123 so that the light is totally reflected at the opening 124a. As a result, the light incoming from the semiconductor laser 112 is deflected toward the optical disc 111. The light thus deflected then passes through the quarter wavelength plate 115 to become right circle polarized light which is then focused onto the recording surface of the optical disc 111 by means of the objective lens 116. Then, the light is reflected by the optical disc 111 to become left circle polarized, and this reflected light then passes through the objective lens and also the quarter wavelength plate 115 to become s polarized light which in turn enters into the prism 125.

After entering into the prism 125, this reflected light from the optical disc 111 also reaches the interface between the prism 125 and the metal cover layer 124 and the opening 124a. In this case, since s polarized light (component of polarization normal to the plane of the drawing) is matched in phase with guided mode T-$E_0$ of the optical waveguide 123, this reflected light is coupled into the optical waveguide 123 through the opening 124a. In the present embodiment, assuming that the incident angle of the reflected light into the opening 124a is 45°, a phase matching condition with the optical waveguide 123 is established for s polarized light. Accordingly, the reflected light reaching the opening 124a is coupled into the optical waveguide 123 to produce guided light therein. Thereafter, in a manner similar to that described with respect to the embodiment shown in FIGS. 10 and 11, the light propagating along the optical waveguide 123 passes through the lenses 126a and 126b to be collected by the photodetector elements 127a through 127d which in turn produce corresponding signals for use in reading of recorded information.

In the present embodiment, the optical waveguide 123 has been described as a single mode waveguide. However, as an alternative, the optical waveguide 123 may be structured in the form of a multi-mode waveguide. In this case also, it is only necessary to structure such that only one of a plurality of guided modes present between the light incident upon the opening 124a and the optical waveguide 123 satisfies a predetermined phase matching condition. It should also be so structured that the light beam does not satisfy such a phase matching condition when travelling toward the optical disc 111 and the reflected light from the optical disc 111 satisfies such a phase matching condition when such reflected light from the optical disc 111 impinges upon the opening 124a.

Figures 14, 15, 16:
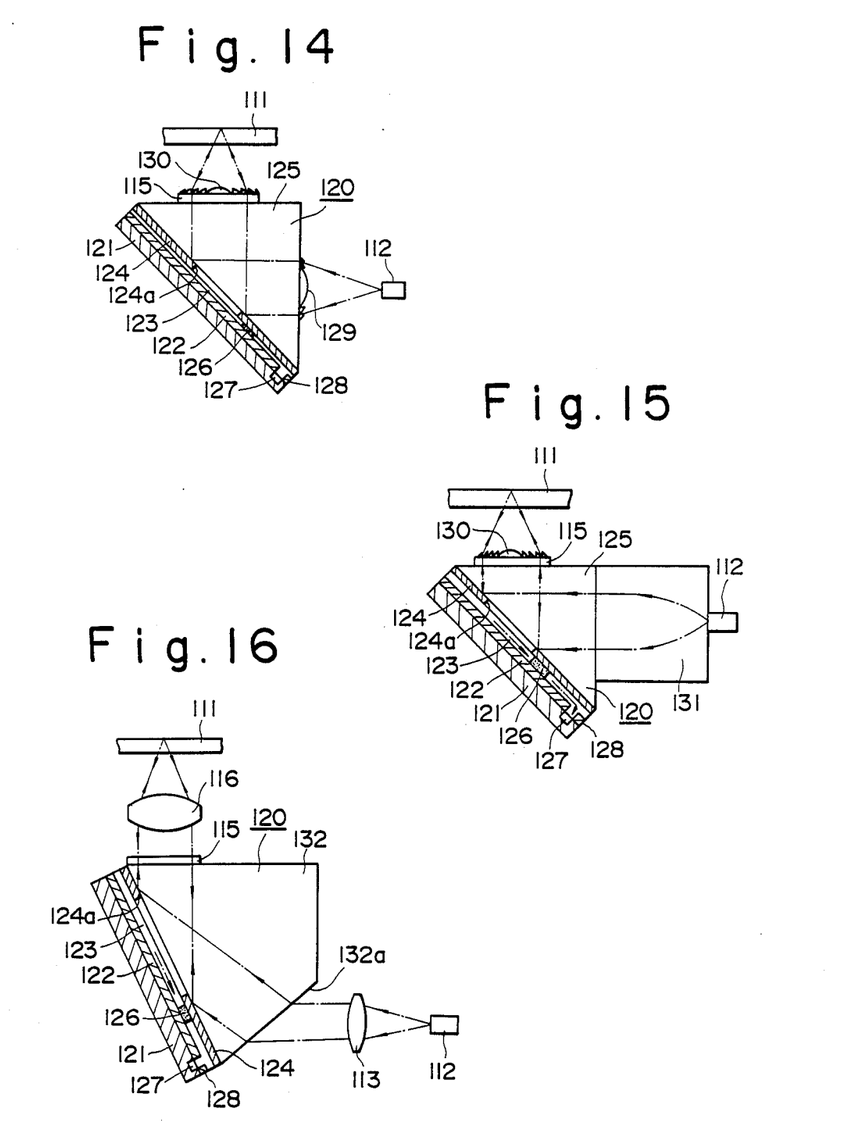

FIG. 14 illustrates a further embodiment of this aspect of the present invention. This embodiment is similar in many respects in structure to the previous embodiment and this embodiment differs from the previous embodiment in that lenses are also integrally formed with the detecting optical system 120. That is, in the present embodiment, the collimator lens 113 for receiving a laser light beam from the semiconductor laser 112 in the previous embodiment has been replaced by a Fresnel lens 129 which is fixedly attached to the prism 125 of the detecting optical system 120. Furthermore, the quarter wavelength plate 115 is fixedly attached to the surface of the prism 125 which faces the optical disc 111, and another Fresnel lens 130 in place of the object lens 116 in the previous embodiment is fixedly attached to the quarter wavelength plate 115. In this manner, in accordance with this embodiment, all of the optical elements constituting an optical pick-up excepting the semiconductor laser 112 are integrally formed. Thus, the optical pick-up can be made extremely compact in size, sturdy in structure and light in weight.

FIG. 15 illustrates a further embodiment of this aspect of the present invention. The present embodiment is similar in many respects in structure to the previous embodiment shown in FIG. 14 excepting that use is made of a distributed index of refraction type lens 131, such as a Selfoc rod lens, as a collimator lens in place of the Fresnel lens 129 used in the previous embodiment of FIG. 14. In the present embodiment, the semiconductor laser 112 is also fixedly mounted on an end surface of the distributed index of refraction type lens 131, so that all of the components constituting an optical pick-up are integrated in structure. It is to be noted that in these embodiments shown in FIGS. 14 and 15, use may also be made of other types of lenses, such as distributed index of refraction type plate-shaped micro lenses in place of Fresnel and/or Selfoc lenses.

FIG. 16 illustrates a still further embodiment of this aspect of the present invention. In the present embodiment, use is made of a four-sided prism 132 having a predetermined cross sectional shape instead of the three-sided prism 125 having a triangular cross section. The prism 132 has an inclined surface 132a which receives the light emitted from the semiconductor laser 112, and this inclined inlet surface 132a has a beam shaping function to have the incident beam elliptic in shape changed to a beam having a desired shape. In the present embodiment, the size of the beam is expanded in the direction parallel to the plane of the drawing in FIG. 16 when the beam passes through this inclined surface 132a. In the present embodiment, the incident angle of the laser beam impinging upon the opening 124a of the metal cover plate 124 is set at an angle larger than 45°.

FIG. 17 illustrates a still further embodiment of this aspect of the present invention. In the present embodiment, use is not made of Si substrate 121 and it is so structured that the prism 125 itself has a role of a substrate. In this embodiment, a metal, such as Ag, is deposited onto the bottom surface of the prism 125, for example, by evaporation or sputtering to thereby form the metal cover layer 124. Then, using a well-known photolithographic process, the metal cover film 124 is partly etched away to thereby define the through-hole or opening 124a. Then, a filler transparent material 133 having an index of refraction lower than that of the optical waveguide 123 is filled into the space defined by the opening 124a. Then, the optical waveguide 123 is formed on the metal cover film 124 and on the filler material 133 filling the opening 124a. And, the photodetector 127 is formed at the downward end of the optical waveguide 123 and the optical waveguide lens 126 is also formed in a manner similar to the previous embodiments.

FIG. 18 illustrates a still further embodiment of this aspect of the present invention. In this embodiment, the optical waveguide 123 is formed on a substrate 134 having an index of refraction lower than that of the optical waveguide 123 and the photodetector 127 is formed at the downward end of the optical waveguide 123. Then, the metal cover layer 124 provided with the opening 124a is formed on the optical waveguide 123, and then this structure is fixedly attached or cemented to the bottom surface of the prism 125. In this embodiment and/or the previous embodiment shown in FIG. 17, the photodetector 127 may be formed as a discrete photodetector or an integrally formed amorphous silicon photodetector.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical waveguide device comprising:
   an optical waveguide having a first index of refraction;
   a cover layer formed on said optical waveguide at least partly from a dielectric material having a complex dielectric constant whose real component has a negative value, said cover layer being formed with an opening extending therethrough; and
   an inlet coupler element fixedly attached to said cover layer covering said opening, said inlet coupler element having a second index of refraction which is higher than said first index of refraction, whereby light incident upon said inlet coupler element is coupled into said optical waveguide through said opening.

2. The device of claim 1, wherein said inlet coupler element is a prism.

3. The device of claim 1, wherein said cover layer is comprised of a metal.

4. The device of claim 1, wherein said opening is filled with a dielectric medium having a third index of refraction which is lower than said first index of refraction.

5. The device of claim 4, wherein said dielectric medium is air.

6. The device of claim 3, wherein said metal is Ag.

7. The device of claim 1, wherein said opening has a predetermined shape and whose characteristic size is substantially equal to or slightly smaller than a characteristic size of a light beam incident upon said inlet coupler element.

8. The device of claim 4, wherein said dielectric medium is a photo-polymer.

9. The device of claim 8, wherein said photo-polymer is formed not only in said opening but also on said cover layer at least partly around said opening.

10. The device of claim 1 further comprising a substrate on which said optical waveguide is formed.

11. The device of claim 10 further comprising a buffer layer sandwiched between said optical waveguide and said substrate.

12. The device of claim 11, wherein said substrate is Si and said buffer layer is comprised of an oxide of Si.

13. The device of claim 1, wherein said inlet coupler element is plate shaped and extends substantially across the entire surface of said optical waveguide.

14. An integrated optical device for use in an optical pick-up, said device comprising:
   an optical waveguide having a first index of refraction;
   a cover layer formed on said optical waveguide at least partly from a dielectric material having a complex dielectric constant whose real component has a negative value, said cover layer being formed with an opening extending therethrough;
   an inlet coupler element fixedly attached to said cover layer covering said opening, said inlet coupler element having a second index of refraction which is higher than said first index of refraction, whereby light incident upon said inlet coupler element is coupled into said optical waveguide through said opening; and
   detecting means formed integrally with said optical waveguide at one end thereof for detecting light coupled into said optical waveguide from said inlet coupler element and propagating along said optical waveguide.

15. The device of claim 14, wherein said inlet coupler element is a prism.

16. The device of claim 14, wherein said cover layer is comprised of a metal.

17. The device of claim 14, wherein said opening is filled with a dielectric medium having a third index of refraction which is lower than said first index of refraction.

18. The device of claim 17, wherein said dielectric medium is air.

19. The device of claim 16, wherein said metal is Ag.

20. The device of claim 14, wherein said opening has a predetermined shape and whose characteristic size is substantially equal to or slightly smaller than a characteristic size of a light beam incident upon said inlet coupler element.

21. The device of claim 17, wherein said dielectric medium is a photo-polymer.

22. The device of claim 21, wherein said photo-polymer is formed not only in said opening but also on said cover layer at least partly around said opening.

23. The device of claim 14 further comprising a substrate on which said optical waveguide is formed.

24. The device of claim 23 further comprising a buffer layer sandwiched between said optical waveguide and said substrate.

25. The device of claim 24, wherein said substrate is Si and said buffer layer is comprised of an oxide of Si.

26. The device of claim 15 further comprising a first Fresnel lens fixedly attached to a first surface of said prism.

27. The device of claim 26 further comprising a quarter wavelength plate fixedly attached to a second surface of said prism and a second Fresnel lens fixedly attached to said quarter wavelength plate.

28. The device of claim 15 further comprising a selfoc rod lens fixedly attached to a first surface of said prism and a semiconductor laser fixedly attached to said selfoc rod lens.

29. The device of claim 14 wherein said inlet coupler element has a four-sided structure having four side surfaces one of which is inclined with respect to said optical waveguide at a predetermined angle other than right angles.

* * * * *